United States Patent
Dhanabalan et al.

(10) Patent No.: US 9,503,965 B2
(45) Date of Patent: Nov. 22, 2016

(54) SET-TOP BOX SETUP VIA NEAR FIELD COMMUNICATION

(71) Applicant: Verizon Patent and Licensing Inc., Arlington, VA (US)

(72) Inventors: Sankar Ram Dhanabalan, Irving, TX (US); Kishore Tallapaneni, Flower Mound, TX (US); Prabhakar Mani, Coppell, TX (US); Anil Kumar Padi, Flower Mound, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 79 days.

(21) Appl. No.: 14/330,546

(22) Filed: Jul. 14, 2014

(65) Prior Publication Data

US 2016/0014820 A1 Jan. 14, 2016

(51) Int. Cl.
 *H04W 48/08* (2009.01)
 *H04W 48/18* (2009.01)
 *H04L 12/24* (2006.01)
 *H04W 12/06* (2009.01)

(52) U.S. Cl.
 CPC .............. *H04W 48/08* (2013.01); *H04L 41/00* (2013.01); *H04W 48/18* (2013.01); *H04W 12/06* (2013.01)

(58) Field of Classification Search
 CPC .................. H04W 4/008; H04W 76/02; H04N 5/4403; H04N 21/43615
 See application file for complete search history.

(56) References Cited

U.S. PATENT DOCUMENTS

| 8,634,771 B2* | 1/2014 | Hassan | H04W 12/02 370/252 |
| 2005/0250487 A1* | 11/2005 | Miwa | H04W 88/021 455/422.1 |
| 2006/0062391 A1* | 3/2006 | Lee | H04L 63/061 380/270 |
| 2006/0074770 A1* | 4/2006 | Oreif | G06F 17/30017 705/14.53 |
| 2006/0126537 A1* | 6/2006 | Booth | H04L 29/06 370/255 |
| 2006/0208088 A1* | 9/2006 | Sekiguchi | G06K 7/1095 235/472.02 |
| 2007/0106764 A1* | 5/2007 | Mansfield | H04L 12/2803 709/220 |

(Continued)

OTHER PUBLICATIONS

Wikipedia, "Service set (802.11 network)" http://en.wikipedia.org/wiki/Service_set_(802.11_network), May 29, 2014, 3 pages.

(Continued)

*Primary Examiner* — Bobbak Safaipour
*Assistant Examiner* — Devan Sandiford

(57) ABSTRACT

A device may be configured to receive network information for connecting to a wireless network that is provided by a network device. The device may store the network information. The device may detect a wireless device based on radio frequency identification (RFID) communication. The device may transmit the network information to the wireless device via the RFID communication. The device may cause the wireless device to connect to the wireless network provided by the network device and set up the wireless device using the wireless network.

20 Claims, 8 Drawing Sheets

(56) References Cited

U.S. PATENT DOCUMENTS

| | | | |
|---|---|---|---|
| 2007/0113258 A1* | 5/2007 | Earle | H04N 7/17318 725/131 |
| 2007/0180485 A1* | 8/2007 | Dua | H04L 29/06027 725/114 |
| 2009/0271830 A1* | 10/2009 | White | H04N 7/163 725/86 |
| 2011/0119745 A1* | 5/2011 | Bremner | H04L 63/0853 726/7 |
| 2011/0234829 A1* | 9/2011 | Gagvani | H04N 5/232 348/222.1 |
| 2011/0264730 A1* | 10/2011 | Dattagupta | H04L 12/2809 709/203 |
| 2011/0275316 A1* | 11/2011 | Suumaki | G06K 7/10237 455/41.1 |
| 2013/0090106 A1* | 4/2013 | Mathews | H04W 4/06 455/418 |
| 2013/0165040 A1* | 6/2013 | McIntyre | H04L 63/0492 455/41.1 |
| 2013/0170392 A1* | 7/2013 | Wyler | H04W 4/008 370/254 |
| 2013/0304879 A1* | 11/2013 | Schmidt | H04W 12/06 709/220 |
| 2014/0050167 A1* | 2/2014 | Smedman | H04W 48/14 370/329 |
| 2014/0191848 A1* | 7/2014 | Imes | H04B 5/0037 340/10.5 |
| 2015/0065038 A1* | 3/2015 | Lee | H04W 8/24 455/41.1 |
| 2015/0081837 A1* | 3/2015 | Bernier | H04W 8/24 709/217 |
| 2015/0223070 A1* | 8/2015 | Chhabra | H04W 12/06 726/5 |
| 2016/0014820 A1* | 1/2016 | Dhanabalan | H04W 76/02 455/41.1 |

OTHER PUBLICATIONS

Wikipedia, "Wi-Fi Protected Setup" http://en.wikipedia.org/wiki/Wi-Fi_Protected_Setup, Jun. 21, 2014, 5 pages.

* cited by examiner

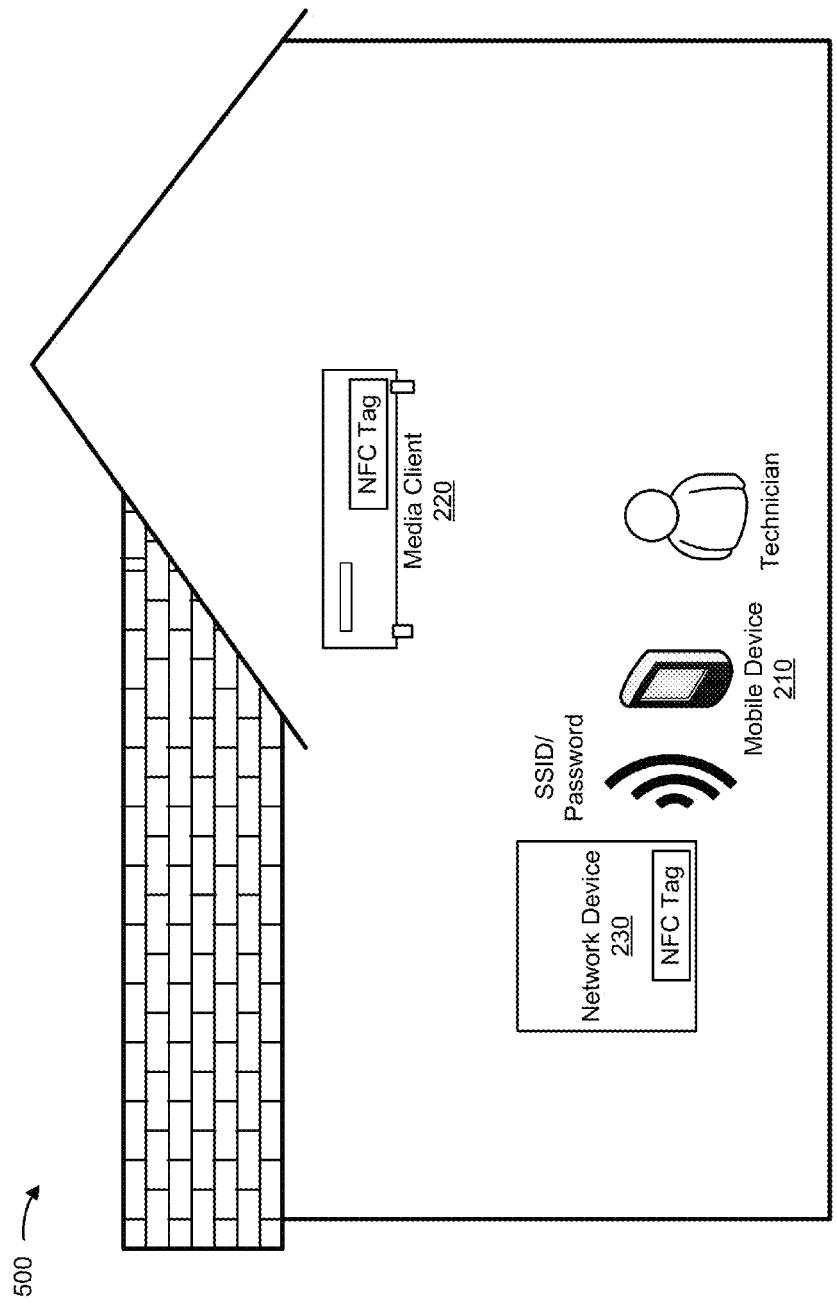

SET-TOP BOX SETUP VIA NEAR FIELD COMMUNICATION

BACKGROUND

A set-top box may provide media content to a user. For example, a set-top box may be used to present a television program or on-demand content to a user. The set-top box may receive a source signal, including the media content, via a wired or a wireless connection. For a wireless signal to be used, the set-top box may connect to a Wi-Fi network using Wi-Fi Protected Setup (WPS) or selecting a service set identifier (SSID) for the Wi-Fi network.

BRIEF DESCRIPTION OF THE DRAWINGS

FIGS. 5A-5C are diagrams of an example implementation relating to the example process shown in FIG. 4.

DETAILED DESCRIPTION OF PREFERRED EMBODIMENTS

The following detailed description of example implementations refers to the accompanying drawings. The same reference numbers in different drawings may identify the same or similar elements.

When a wireless set-top box is set up or installed at a location, the wireless set-top box may connect to a wireless network provided by a network device (e.g., a router) using a network identifier and a network passcode. For example, a technician that is setting up the wireless set-top box may use a remote control and a user interface provided by the set-top box to manually enter a network identifier and a network passcode so that the set-top box may connect to the network device. Manually entering the network identifier and the network passcode via the set-top box interface may be a time consuming process. Moreover, the technician may have multiple wireless set-top boxes to set up at the location. Accordingly, the technician may manually input the network identifier and the network passcode into each of the set-top boxes, thereby using valuable time and reducing the number of appointments the technician may be able to service.

Implementations described herein may efficiently set up a media client (e.g., a set-top box) without having to manually input network information into the media client. In some implementations described herein, a mobile device may receive the network information for connecting to a network device and distribute the network information to one or more media clients such that the media clients may automatically be set up using a wireless connection with the network device.

Figure 1A:
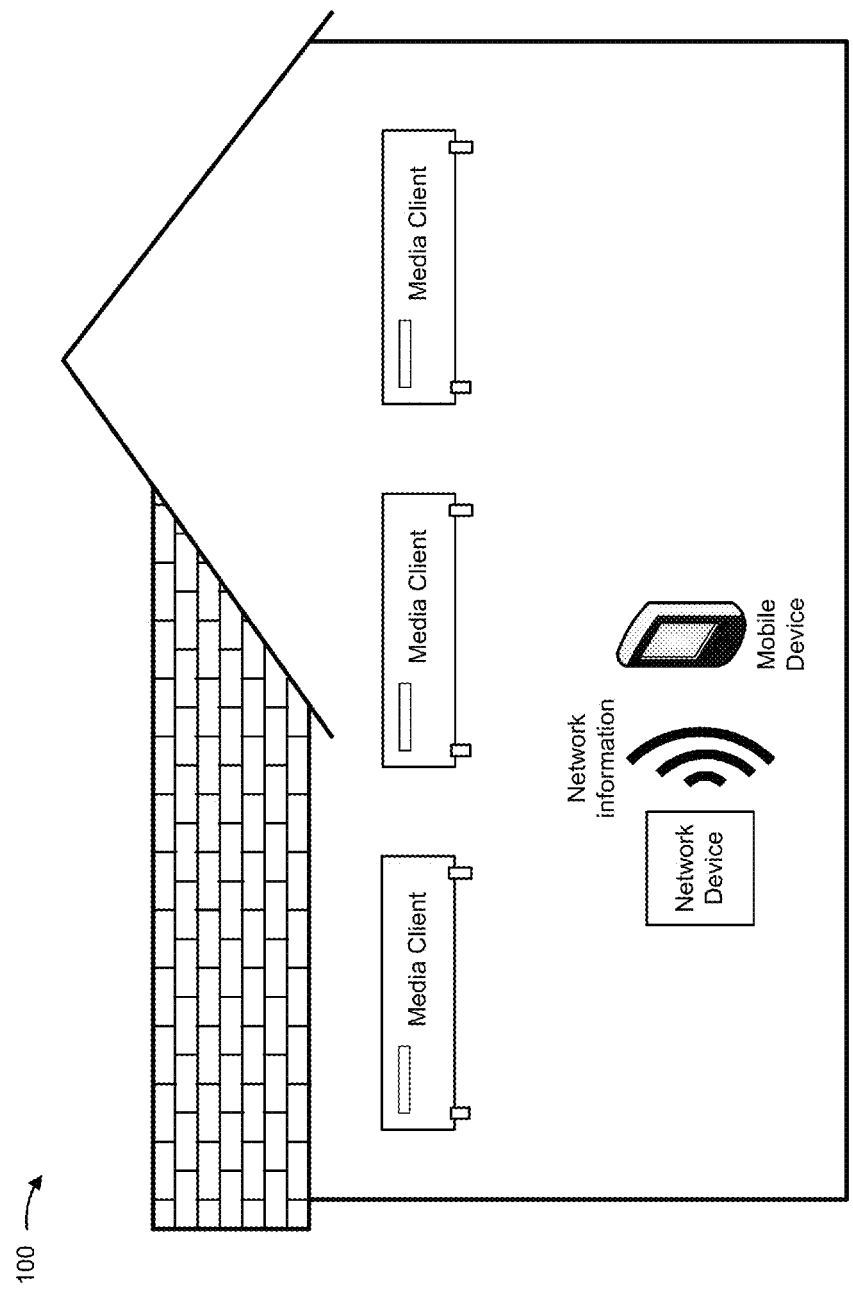
FIGS. 1A and 1B are diagrams of an overview of an example implementation described herein.
Figure 1B:
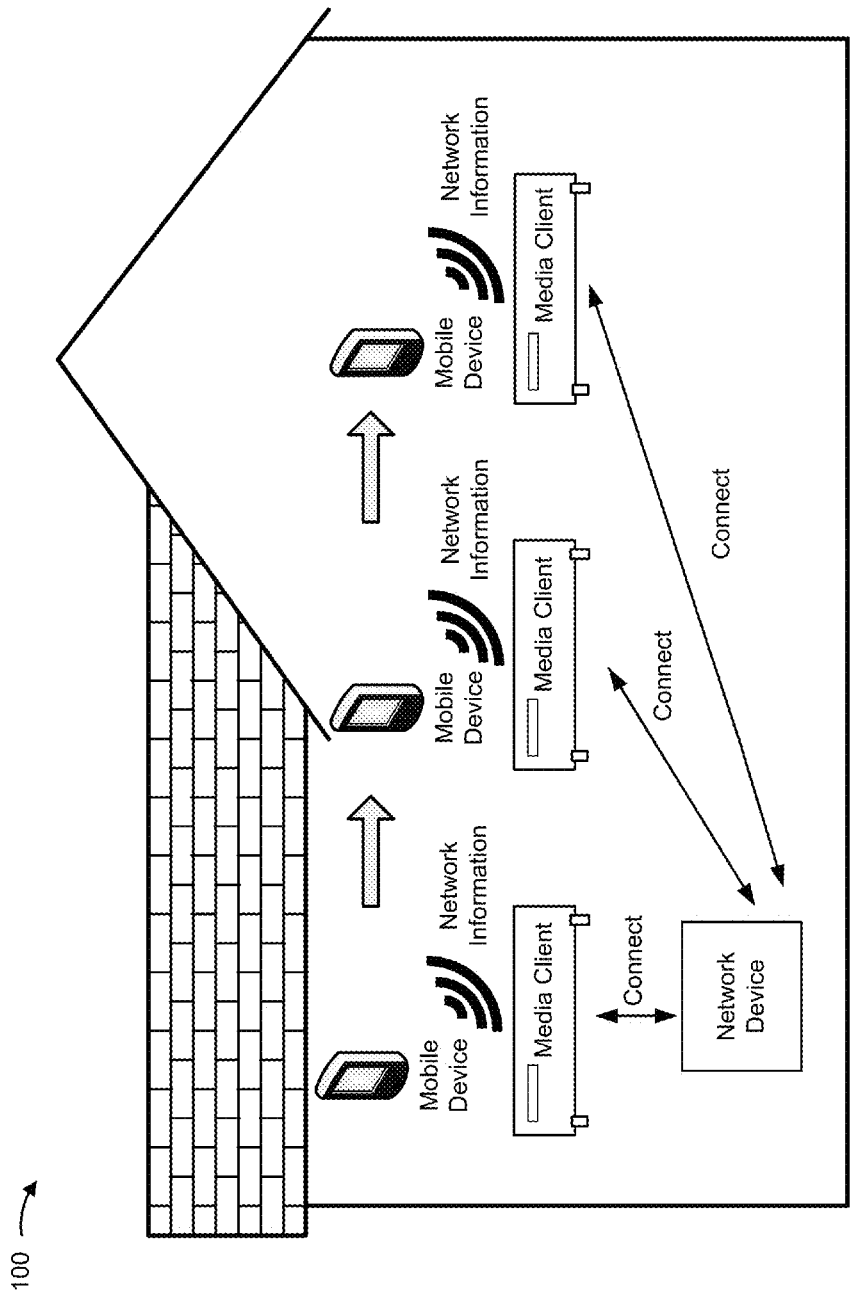

FIGS. 1A and 1B are diagrams of an overview of an example implementation 100 described herein. In FIG. 1A, assume a user is setting up multiple wireless media client devices at a location (e.g., a house). Further, assume a network device (e.g., a router) provides a wireless network (e.g., a Wi-Fi network) that allows the media client devices to connect to a server. Also, assume the network device, the mobile device, and the media client devices are capable of using radio frequency identification (RFID) communication (e.g., near field communication (NFC)) or another kind short range radio frequency (RF) communication (e.g., Bluetooth). Further, assume the network device stores network information for connecting to the wireless network. For example, the network information may indicate a network identifier that identifies the wireless network and/or a network passcode used to authenticate a device connecting to the wireless network.

As shown in FIG. 1A, the user may use the mobile device to connect to the network device using RFID communication (e.g., NFC). The mobile device may read the network information stored by the network device, and store the network information in a memory included in the mobile device.

As shown in FIG. 1B, the user may use the mobile device to transmit the network information to each media client via RFID communication. The media clients may receive the network information and use the network information to connect to the network device via the wireless network provided by the network device. The media clients may automatically connect to a server, via the network device, and set up or activate the media clients.

In this way, the media clients may connect to the network device without the user having to manually input the network information into the media clients.

Figure 2:
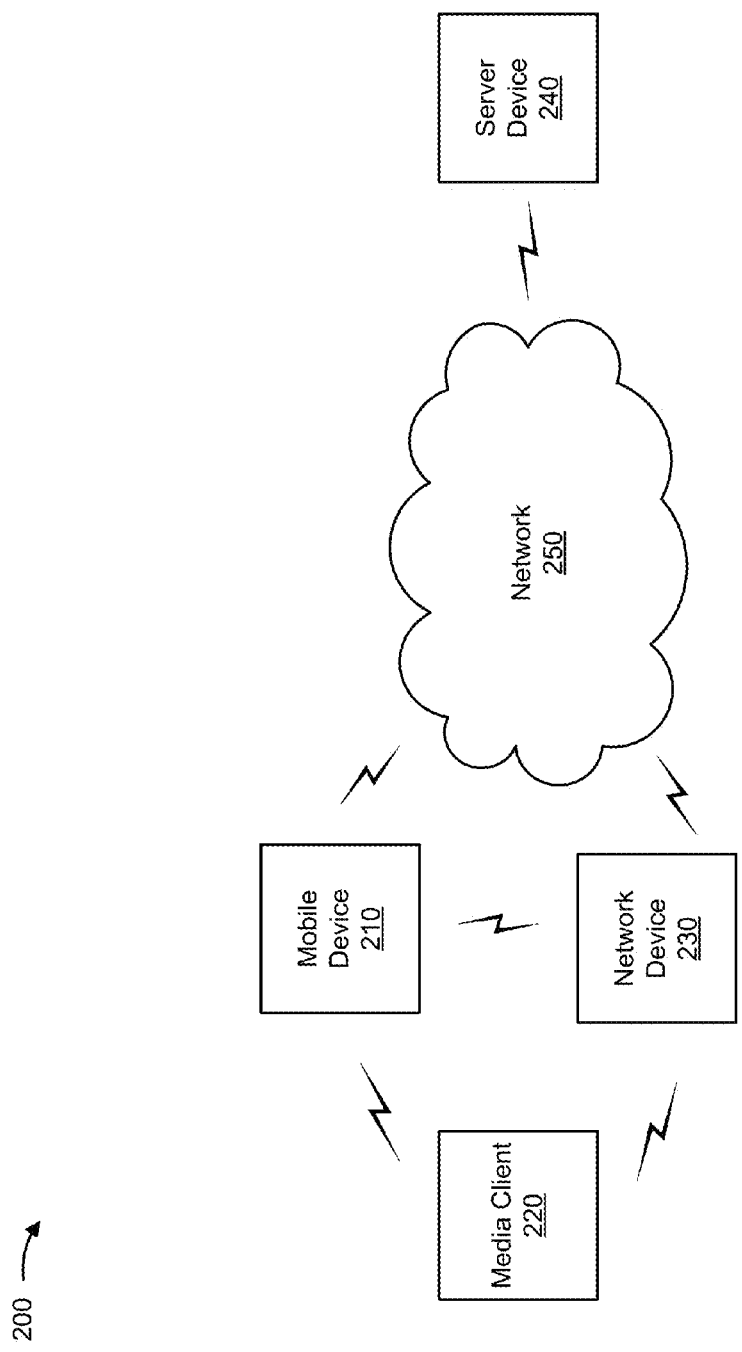
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a mobile device 210, a media client 220, a network device 230, a server device 240, and/or a network 250. Devices of environment 200 may interconnect via wired connections, wireless connections, or a combination of wired and wireless connections.

Mobile device 210 may include a device capable of receiving, processing, and/or providing information. For example, mobile device 210 may include a mobile phone (e.g., a smart phone, a radiotelephone, etc.), a computing device (e.g., a laptop computer, a tablet computer, a handheld computer, a gaming device, etc.), or a similar device. In some implementations, mobile device 210 may include a communication interface that allows mobile device 210 to receive information from and/or transmit information to another device in environment 200. For example, mobile device 210 may include a RFID chip (e.g., a NFC chip) for communicating with media client 220, network device 230, and/or another device in environment 200. As used herein, the term "mobile RFID chip" may refer to a RFID chip included in mobile device 210.

Media client 220 may include a device capable of receiving, transmitting, and/or processing multimedia content and providing the multimedia content to a user (e.g., via a television or other display device). Examples of media client 220 may include a set-top box, a casting stick (e.g., a high-definition media interface (HDMI) dongle), a computer, a cable card, a gaming device, a portable electronic device, and/or another type of device capable of receiving, transmitting, and/or processing multimedia content and providing the multimedia content to a user. In some implementations, media client 220 may include a RFID chip (e.g., a NFC chip) for communicating with mobile device 210 and/or another device in environment 200. As used herein, the term "media RFID chip" may refer to a RFID chip included in media client 220.

Network device 230 may include one or more devices (e.g., one or more traffic transfer devices) capable of processing and/or transferring data. For example, network device 230 may include a router, a modem, a gateway, an access point, a firewall, a switch, a hub, a bridge, a reverse proxy, a server (e.g., a proxy server), a security device, an intrusion detection device, a load balancer, and/or a similar device. In some implementations, network device 230 may include a wireless router that wirelessly communicates with media client 220 and transfers data between media client 220 and network 250. In some implementations, network device 230 may include a RFID chip (e.g., a NFC chip) for communicating with mobile device 210 and/or another device in environment 200. As used herein, the term "network RFID chip" may refer to a RFID chip included in network device 230.

Server device 240 may include one or more devices capable of storing, processing, and/or routing information. In some implementations, server device 240 may include a communication interface that allows server device 240 to receive information from and/or transmit information to other devices in environment 200. In some implementations, server device 240 may be used to initially set up or activate media client 220.

Network 250 may include one or more wired and/or wireless networks. For example, network 250 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
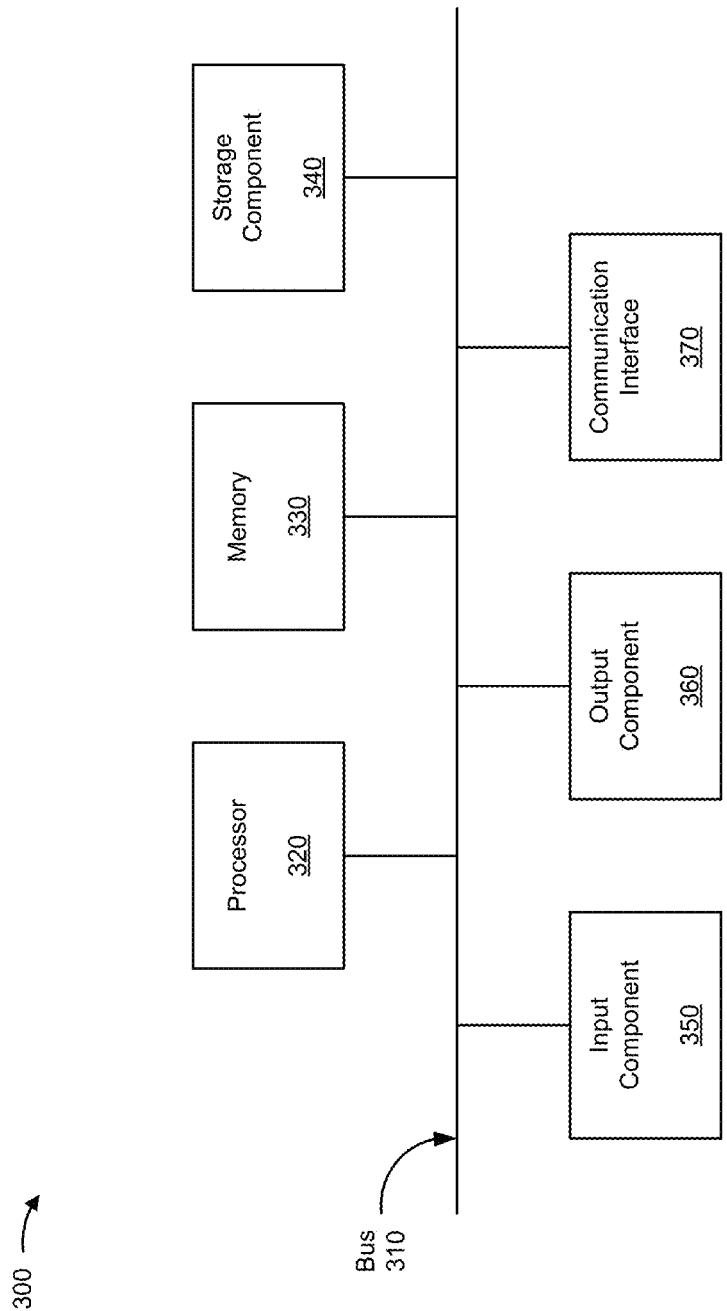
FIG. 3 is a diagram of example components of one or more devices of FIG. 2.

FIG. 3 is a diagram of example components of a device 300. Device 300 may correspond to mobile device 210, media client 220, network device 230, and/or server device 240. In some implementations, mobile device 210, media client 220, network device 230, and/or server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface (e.g., RFID, NFC, Bluetooth, etc.), a universal serial bus (USB) interface, a Wi-Fi interface, a cellular network interface, or the like. In some implementations, communication interface 370 may include a passive RFID chip (e.g., a passive NFC chip) that is provided power by electromagnetic energy transmitted from a RFID reader, or include an active RFID chip (e.g., an active NFC chip) that is provided power by an attached power supply (e.g., a power supply included in device 300).

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
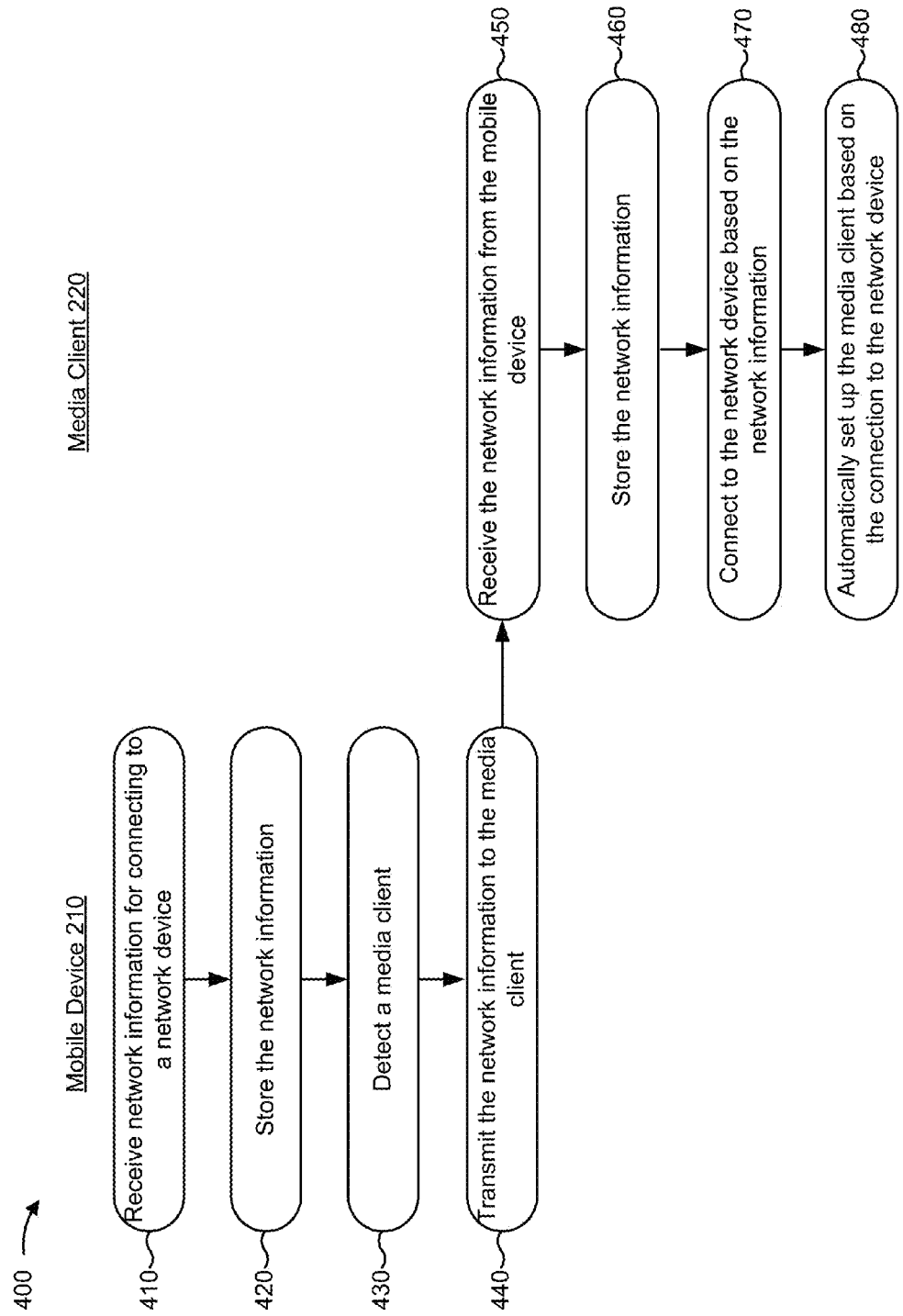
FIG. 4 is a flow chart of an example process for setting up a media client.

FIG. 4 is a flow chart of an example process 400 for setting up media client 220. In some implementations, one or more process blocks of FIG. 4 may be performed by mobile device 210 and/or media client 220. Additionally, or alternatively, one or more process blocks of FIG. 4 may be performed by another device or a group of devices separate from or including mobile device 210 and/or media client 220, such as network device 230 and/or server device 240.

As shown in FIG. 4, process 400 may include receiving network information for connecting to network device 230 (block 410). For example, mobile device 210 may receive the network information via a wireless or a wired connection (e.g., a USB connection).

The network information may permit a device to connect to network device 230 via a wireless network (e.g., a Wi-Fi network) provided by network device 230. In some implementations, the network information may include a network identifier that identifies the wireless network (e.g., a network name, a SSID, etc.). The network identifier may include a string of characters of any length. Additionally, or alternatively, the network information may include a network passcode used to authenticate a connection to the wireless network. For example, the network passcode may include a password or other authentication information. The network passcode may include a string of characters of any length.

In some implementations, network device 230 may include a network RFID chip. The network RFID chip may include a memory or have access to a memory that stores the network information. In some implementations, the network RFID chip may store default network information that is originally set up for network device 230. Additionally, or alternatively, network device 230 may update the network information stored in the network RFID chip (e.g., a rewritable RFID chip) based on the network information being updated by a user. For example, a user may change a network passcode from an original passcode set for network device 230, and network device 230 may update the network passcode stored by the network RFID chip. In some implementations, the network information stored by the network RFID chip may be encrypted, such that only authorized devices may read and decrypt the network information.

In some implementations, mobile device 210 may include a mobile RFID chip (e.g., an active RFID chip) and use the mobile RFID chip to read the network information from the network RFID chip. Accordingly, mobile device 210 may receive the network information by reading the network information from network device 230 using NFC or another short range RF communication technique. In some implementations, mobile device 210 may be provided with a key to decrypt encrypted network information read from the network RFID chip.

In some implementations, network device 230 may include a label having a barcode and/or a two-dimensional barcode (e.g., a Quick Response (QR) code) printed thereon. The barcode and/or two-dimensional barcode (generally referred to as a "barcode") may represent the network information. Mobile device 210 may include an imaging device (e.g., a camera) and use the imaging device to scan the barcode. Mobile device 210 may determine the network information based on the scanned barcode.

In some implementations, network device 230 may include a label having the network information printed thereon. For example, the label may have text of the network identifier and/or the network passcode printed thereon. Mobile device 210 may take an image of the network information (e.g., the text) printed on the label and use an optical character recognition (OCR) application installed on mobile device 210 to recognize and obtain the network information based on the text.

In some implementations, mobile device 210 may send a request, via network 250, to server device 240 that requests server device 240 provide the network information. Server device 240 may be operated by an Internet Service Provider (ISP) that provided network device 230 to a user of network device 230 (e.g., a customer of the ISP). The request may include information indicating the user of network device 230, a customer identifier (e.g., that identifies a customer of the ISP), an account identifier (e.g., that identifies an account with the ISP), and/or a network device identifier (e.g., a serial number of network device 230). Additionally, or alternatively, the request may include authentication information that authenticates mobile device 210 is authorized to receive the network information from server device 240. Server device 240 may receive the request and obtain the network information based on the request. For example, server device 240 may query a data structure associating the network information and the user of network device 230, the customer identifier, the account identifier, and/or the network device identifier. Server device 240 may send a response to mobile device 210 including the network information. Mobile device 210 may receive the response including the network information from server device 240.

In some implementations, a user of mobile device 210 may input the network information into mobile device 210. For example, mobile device 210 may receive the network information by a user typing the network input information into mobile device 210.

As further shown in FIG. 4, process 400 may include storing the network information (block 420). For example, mobile device 210 may store the network information in a memory included in or accessible by mobile device 210.

In some implementations, mobile device 210 may store the network information without using the network information to connect to network device 230 via the wireless network (e.g., a Wi-Fi network) provided by network device 230.

In some implementations, mobile device 210 may activate an application to receive the network information. The application may prevent mobile device 210 from using the received network information to connect mobile device 210 to network device 230 via the wireless network. For example, a technician that is using mobile device 210 to set up media client 220 at a customer's home may be prevented from connecting to the customer's home Wi-Fi network using mobile device 210 to ensure the privacy and security of the home Wi-Fi network. In some implementations, the application may cause mobile device 210 to store the network information in a secured memory that may not be accessed by a user of mobile device 210.

Additionally, or alternatively, mobile device 210 may display or present, for display, information indicating mobile device 210 has received the network information. However, the application may prevent mobile device 210 from displaying the network information itself. For example, a user specified network passcode may not be displayed to a user of mobile device 210 (e.g., a technician), thereby keeping the network passcode secure.

As further shown in FIG. 4, process 400 may include detecting media client 220 (block 430). For example, mobile device 210 may detect media client 220.

In some implementations, mobile device 210 may use the mobile RFID chip to detect the media RFID chip included in media client 220. The media RFID chip may be passive or active. The media RFID chip may have access to a media client identifier stored in a memory included in or accessible by the media RFID chip. The media client identifier may indicate that the media RFID chip is included in a media client 220 and is not a RFID chip included in another kind of device. The mobile RFID chip may read the media client identifier and confirm that the media RFID chip is a chip included in a media client 220 based on the media client identifier.

In some implementations, media client 220 may be powered off while mobile device 210 detects media client 220. For example, the media RFID chip may be a passive chip that mobile device 210 may communicate with while media client 220 is not powered on.

In some implementations, mobile device 210 may detect media client 220 using another RF communication method, such as Bluetooth.

As further shown in FIG. 4, process 400 may include transmitting the network information to media client 220 (block 440). For example, mobile device 210 may send the network information to media client 220 via a wireless or a wired connection (e.g., a USB connection).

In some implementations, mobile device 210 may transmit the network information to media client 220 via RFID communication. For example, the mobile RFID chip may send the network information to the media RFID chip. Additionally, or alternatively, mobile device 210 may transmit the network information using another kind of RF communication (e.g., Bluetooth).

In some implementations, mobile device 210 may detect media client 220 using the RFID communication, and handover communication to another kind of RF communication (e.g., Bluetooth). For example, mobile device 210 and media client 220 may activate Bluetooth based on mobile device 210 communicating with media client 220 via RFID communication. Mobile device 210 may then send the network information to media client 220 via the other kind of RF communication.

In some implementations, the application executed by mobile device 210 may cause mobile device 210 to send a command to media client 220 to use the network information to connect to network device 230 and setup media client 220 via the connection with network device 230. For example, the command may instruct media client 220 to connect to server device 240 to set up media client 220 for use by a user.

As further shown in FIG. 4, process 400 may include receiving the network information from mobile device 210 (block 450). For example, media client 220 may receive the network information via a wireless or wired connection (e.g., a USB connection).

In some implementations, media client 220 may receive the network information while media client 220 is powered off. For example, media client 220 may receive the network information via the media RFID chip (e.g., a passive RFID chip).

In some implementations, media client 220 may receive the command, sent by mobile device 210, instructing media client 220 to connect to server 240 to set up media client 220.

As further shown in FIG. 4, process 400 may include storing the network information (block 460). For example, media client 220 may store the network information in a memory included in or accessible by media client 220.

In some implementations, when the media RFID chip receives the network information from mobile device 210, the media RFID chip may store the network information in a memory included in or accessible by the media RFID chip. The media RFID chip may be a rewriteable and passive RFID chip that permits mobile device 210 to write the network information into the memory. Upon being powered on, media client 220 may read the network information stored in the memory included in the media RFID chip, and store the network information in a separate memory included in or accessible by media client 220. In some implementations, the memory included in the media RFID chip may continue to store the network information after media client 220 reads out the network information.

As further shown in FIG. 4, process 400 may include connecting to network device 230 based on the network information (block 470). For example, media client 220 may connect to network device 230 based on the network information.

In some implementations, media client 220 may identify network device 230 based on the network identifier included in the network information. Media client 220 may send the network passcode to network device 230 and network device 230 may receive the network passcode. Network device 230 may authenticate media client 220 based on the network passcode and establish a connection between network device 230 and media client 220. In other words, network device 230 may grant media client 220 access to the wireless network provided by network device 230 and permit media client 220 to communicate with network 250 via network device 230.

In some implementations, the network information included in the media RFID chip may be updated by mobile device 210. For example, an updated network passcode for the wireless network provided by network device 230 may be received from mobile device 210 and/or new network information for a new wireless network may be received from mobile device 210. Accordingly, media client 220 may monitor the network information stored by the media RFID chip to determine whether the network information stored by the media RFID chip has been changed or updated. If the network information is changed or updated, media client 220 may use the updated network information to reconnect to network device 230 (e.g., with an updated passcode) or connect to a new network device 230.

As further shown in FIG. 4, process 400 may include automatically setting up media client 220 based on the connection to network device 230 (block 480). For example, media client 220 may automatically set up media client 220 by communicating with server device 240 via network device 230.

Media client 220 may send a setup request to server device 240 to set up media client 220 for use. In some implementations, media client 220 may send the setup request based on the command received from mobile device 210. Media client 220 and server device 240 may communicate via network device 230 and network 250 to set up and/or activate media client 220 for use. For example, server device 240 may set up media client 220 by linking media client 220 to a customer account. In other words, media client 220 may execute an automatic provisioning function to set up media client 220 with server device 240.

In some implementations, media client 220 may automatically send the setup request to server device 240 based on media client 220 connecting to the wireless network provided by network device 230.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5B:
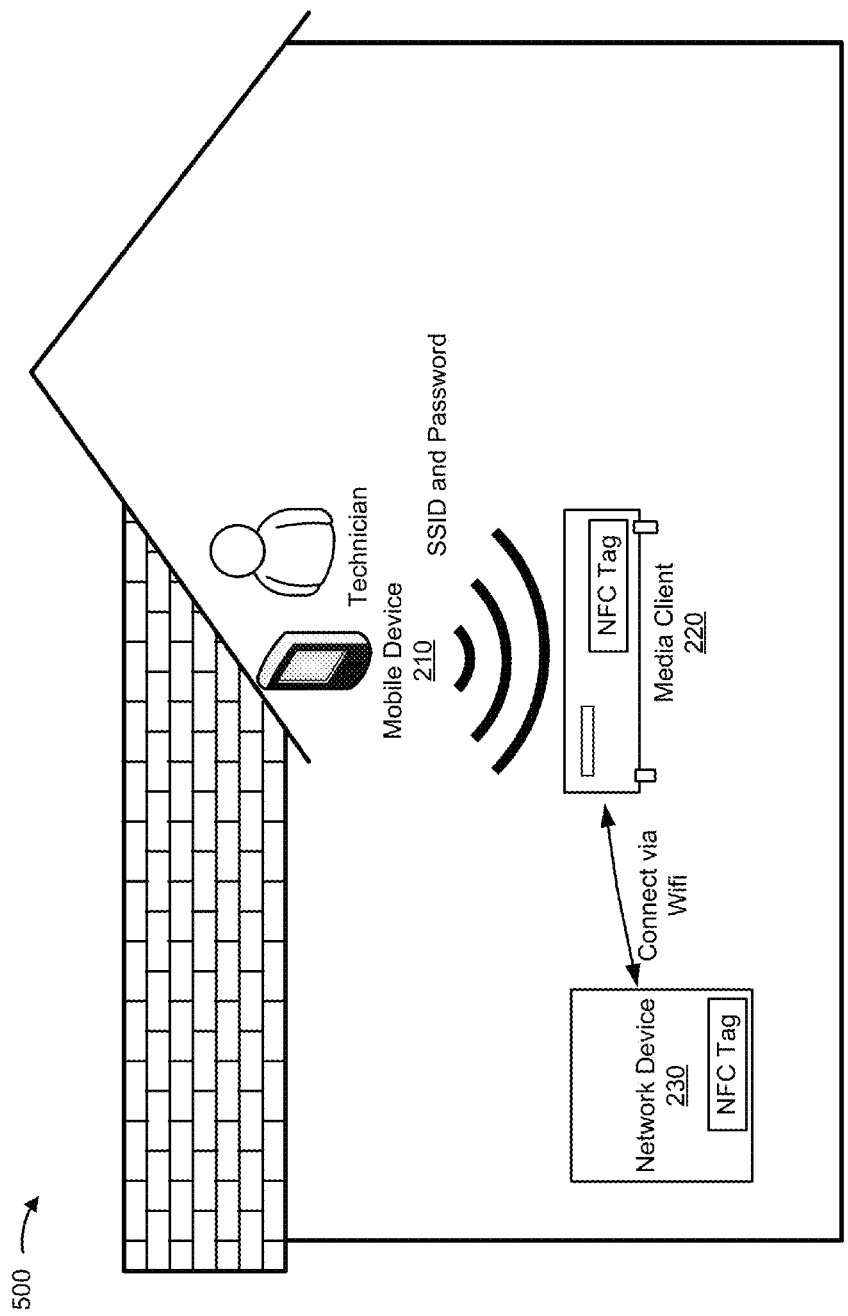
Figure 5C:
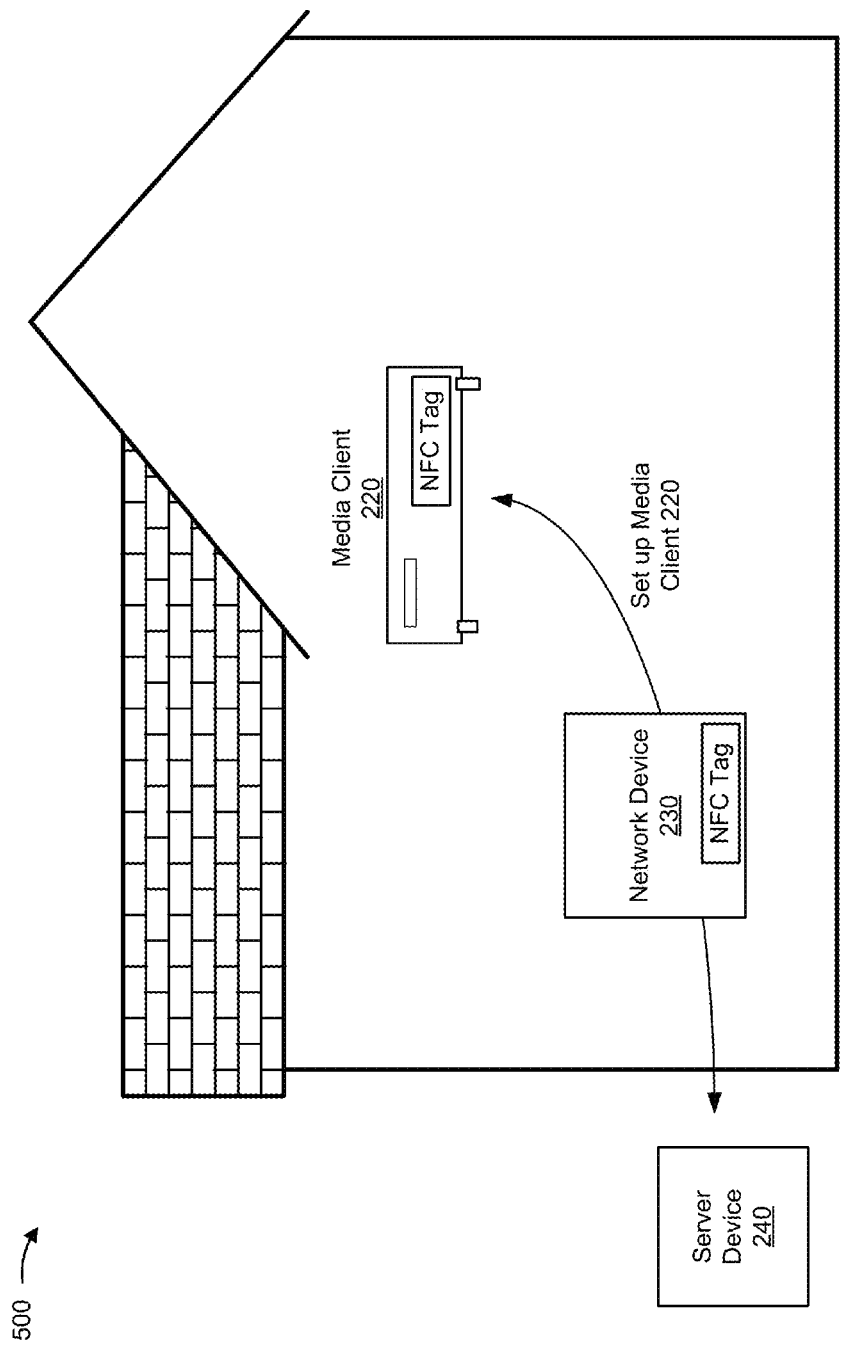

FIGS. 5A-5C are diagrams of an example implementation 500 relating to example process 400 shown in FIG. 4. FIGS. 5A-5C show an example of setting up media client 220. In example implementation 500, assume a customer orders Internet service and cable TV service from a service provider. Further, assume the service provider sends a technician to the customer's house to set up a network device 230 to provide the Internet service and a media client 220 (e.g., a set-top box) to provide the cable TV service. Further, assume the technician installs network device 230 at the customer's house and that network device 230 provides a Wi-Fi network.

As shown in FIG. 5A, assume network device 230 and mobile device 210 each includes a NFC chip (e.g., a RFID chip). The technician may use mobile device 210 to communicate with network device 230 via NFC. Mobile device 210 may obtain a SSID and a password for connecting to the Wi-Fi network from network device 230 using NFC. Mobile device 210 may store the SSID and the password in a memory included in or accessible by mobile device 210.

As shown in FIG. 5B, assume media client 220 includes a NFC chip. The technician may bring mobile device 210 into close enough proximity to media client 220 to connect to media client 220 using NFC. Mobile device 210 may send the SSID and the password to media client 220 and media client 220 may receive the SSID and the password. Media client 220 may use the SSID and the password to connect to the Wi-Fi network provided by network device 230.

As shown in FIG. 5C, media client 220 may communicate with server device 240, via the Wi-Fi connection with network device 230, to automatically set up media client 220. For example, server device 240 may activate media client 220 for use by the customer and link media client 220 to the customer's account. The technician may repeat this process by using mobile device 210 to send the SSID and the password to any other media clients 220 that are to be set up at the customer's house.

In this way, the technician is able to set up one or more media clients 220 without having to manually input the SSID and the password for the Wi-Fi network into each media client 220.

As indicated above, FIGS. 5A-5C are provided merely as an example. Other examples are possible and may differ from what was described with regard to FIGS. 5A-5C.

Implementations described herein may efficiently set up media client 220 (e.g., a set-top box) without having to manually input network information into media client 220. In some implementations described herein, mobile device 210 may receive the network information for connecting to network device 230 and distribute the network information to one or more media clients 220 such that the media clients 220 may automatically be set up using a wireless connection with network device 230.

The foregoing disclosure has been primarily described with respect to using mobile device 210 to provide network information to media client 220 so that media client 220 may connect to network device 230 and set up media client 220 via network device 230. However, mobile device 210 may provide the network information to any device capable of wirelessly connecting to network device 230 via a wireless network provided by network device 230. For example, mobile device 210 may provide the network information to an appliance (e.g., a refrigerator, an oven, a stove, a microwave, a dishwasher, a washing machine, a dryer, etc.), a camera (e.g., a security camera), a light bulb, a lock, a machine-to-machine (M2M) device, and/or any other smart object to use to connect to the wireless network provided by network device 230.

Moreover, at any given time, multiple devices may be connected to a wireless network provided by network device 230 (e.g., a Wi-Fi network). A network passcode for the wireless network may be changed after these devices are already connected to the wireless network (e.g., due to the security of the previous network password being compromised). Thus, the devices may have to reconnect to the wireless network using the new network passcode. Manually inputting the passcode into each device may be a difficult (e.g., due to cumbersome user interfaces provided by the devices or due to no user interfaces provided by the devices) and/or time consuming (e.g., due to the number of devices and/or manually inputting the passcode). However, implementations described herein may allow a user to use mobile device 210 to obtain the network information (e.g., the new network passcode). The user may then simply bring mobile device 210 into proximity with the devices (e.g., close enough to communicate using a RFID chip) to automatically provide the network information to the devices to be used to reconnect to the wireless network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive, from a server device operated by a service provider and via a first network, first network information for connecting to a wireless network that is provided by a network device,
the wireless network being a second network;
store the first network information;
detect a plurality of wireless devices based on radio frequency identification (RFID) communication;
transmit the first network information to the plurality of wireless devices via the RFID communication;
cause the plurality of wireless devices, using the first network information, to connect to the wireless network and set up the plurality of wireless devices using the wireless network;
receive second network information for connecting to the wireless network;
store the second network information;
transmit the second network information to the plurality of wireless devices via another RFID communication; and
cause the plurality of wireless devices, using the second network information, to reconnect to the wireless network.

2. The device of claim 1, where the first network information includes a network identifier that identifies the wireless network and includes a network passcode for authenticating the connection to the wireless network, and
where the one or more processors, when causing the plurality of wireless devices to connect to the wireless network, are to:
cause the plurality of wireless devices to connect to the wireless network based on the network identifier and the network passcode.

3. The device of claim 1, where the RFID communication is a first RFID communication;
where the other RFID communication is a second RFID communication; and
where the one or more processors, when receiving the second network information, are to:
receive the second network information from the network device via a third RFID communication.

4. The device of claim 1, where the RFID communication includes Near Field Communication (NFC).

5. The device of claim 1, where the one or more processors are further to:
detect a barcode on the network device; and
determine the second network information based on the barcode.

6. The device of claim 1, where the one or more processors are further to:
detect text on the network device using optical character recognition; and
determine the second network information based on the text.

7. The device of claim 1, where the one or more processors are further to:
prevent the device from using the first network information to connect to the wireless network.

8. A computer-readable medium storing instructions, the instructions comprising:
one or more instructions that, when executed by one or more processors, cause the one or more processors to:
receive, from a server device operated by a service provider and via a first network, first network information for connecting to a wireless network that is provided by a network device,
the wireless network being a second network,
store the first network information;
detect a plurality of media client devices using radio frequency identification (RFID) communication;
transmit the first network information to the plurality of media client devices using the RFID communication;
cause the plurality of media client devices, using the first network information, to connect to the wireless network and set up the plurality of media client devices via the wireless network;
receive second network information for connecting to the wireless network;
store the second network information;
transmit the second network information to the plurality of media client devices via another RFID communication; and
cause the plurality of media client devices, using the second network information, to reconnect to the wireless network.

9. The computer-readable medium of claim 8, where the one or more instructions, when executed by the one or more processors, further cause the one or more processors to:
send a request for the first network information to the server device,
the request indicating at least one of;
a user identifier that identifies a user of the network device,
a customer identifier that identifies a customer of the service provider,
an account identifier that identifies an account with the service provider, or
a network device identifier that identifies the network device; and
where the one or more instructions, that cause the one or more processors to receive the first network information, cause the one or more processors to;
receive the first network information from the server device based on the request.

10. The computer-readable medium of claim 8, where the one or more instructions, that cause the one or more processors to receive the first network information, cause the one or more processors to:
receive the first network information via user input.

11. The computer-readable medium of claim 8, where the one or more instructions, that cause the one or more processors to store the first network information, cause the one or more processors to:
store the first network information in a secure memory of a mobile device that is not accessible by a user of the mobile device.

12. The computer-readable medium of claim 8, where the one or more instructions, that cause the one or more processors to cause the plurality of media client devices to connect to the wireless network, cause the one or more processors to:
    cause the plurality of media client devices to connect to the wireless network by sending the plurality of media client devices a command to connect to the wireless network using the first network information.

13. A method, comprising:
    receiving, by a plurality of media client devices, network information from a mobile device via a wireless communication,
        the network information being sent to the mobile device from a server device operated by a service provider and via a first network, and
        the network information permitting the plurality of media client devices to connect to a wireless network provided by a network device,
        the wireless network being a second network;
    storing, by the plurality of media client devices, the network information;
    connecting, by the plurality of media client devices, to the wireless network based on the network information;
    sending, by the plurality of media client devices, a setup message to the server device based on connecting to the wireless network,
        the setup message being sent to the server device via the wireless network to activate the plurality of media client devices;
    receive, by the plurality of media client devices, updated network information from the mobile device,
        the updated network information permitting the plurality of media client devices to connect to the wireless network;
    storing, by the plurality of media client devices, the updated network information; and
    reconnecting, by the plurality of media client devices, to the wireless network based on the updated network information.

14. The method of claim 13, where the wireless communication includes Near Field Communication (NFC).

15. The method of claim 13, further comprising:
    receiving a command from the mobile device to use the network information to connect to the wireless network and to send the setup message to the server device,
    where connecting to the wireless network includes;
        connecting to the wireless network based on the command, and
    where sending the setup message to the server device includes;
        sending the setup message to the server device based on the command.

16. The method of claim 13, where receiving the network information comprises:
    receiving the network information via a passive radio frequency identification (RFID) chip included in the plurality of media client devices, and
    where storing the network information includes;
        storing the network information in a memory included in the passive RFID chip.

17. The method of claim 16, where the memory included in the passive RFID chip is a first memory, the method further comprising:
    reading, by the plurality of media client devices, the network information stored in the first memory upon the plurality of media client devices powering on; and
    storing the read network information in a second memory included in or accessible by the plurality of media client devices; and
    where connecting to the wireless network includes;
        connecting to the wireless network based on the read network information stored in the second memory.

18. The method of claim 13, further comprising:
    establishing communication with the mobile device using a first type of wireless communication; and
    activating a second type of wireless communication based on establishing the communication using the first type of wireless communication; and
    where receiving the network information includes:
        receiving the network information from the mobile device via the second type of wireless communication.

19. The method of claim 18, where the first type of communication is Near Field Communication (NFC) and the second type of communication is Bluetooth.

20. The method of claim 13, where the updated network information indicates a different network passcode than indicated by the network information.

* * * * *